(12) United States Patent
Bierman

(10) Patent No.: US 9,695,020 B2
(45) Date of Patent: Jul. 4, 2017

(54) WHEEL LIFTING DEVICE

(75) Inventor: Steve Bierman, Marcus, IA (US)

(73) Assignee: Bierman Sales, LLC, Marcus, IA (US)

( * ) Notice: Subject to any disclaimer, the term of this patent is extended or adjusted under 35 U.S.C. 154(b) by 1174 days.

(21) Appl. No.: 12/424,973

(22) Filed: Apr. 16, 2009

(65) Prior Publication Data

US 2009/0315353 A1 Dec. 24, 2009

Related U.S. Application Data

(60) Provisional application No. 61/045,514, filed on Apr. 16, 2008.

(51) Int. Cl.
*B66C 1/42* (2006.01)
*B60B 30/06* (2006.01)

(52) U.S. Cl.
CPC ............. *B66C 1/422* (2013.01); *B60B 30/06* (2013.01)

(58) Field of Classification Search
CPC ............ B60B 30/06; B66C 1/422; B66C 1/28
USPC .... 414/745.5, 433, 445, 450, 618, 620, 621, 414/624, 626; 294/3, 8.5, 31.1, 85, 294/87.22, 198, 106, 119
See application file for complete search history.

(56) References Cited

U.S. PATENT DOCUMENTS

| | | | |
|---|---|---|---|
| 1,399,351 A | 12/1921 | Lee | |
| 1,416,958 A | 5/1922 | Kelley et al. | |
| 1,591,193 A * | 7/1926 | Weaver | 157/1.26 |
| 2,380,313 A | 7/1945 | Johnson et al. | |
| 2,509,950 A | 5/1950 | Zierke | |
| 2,705,658 A | 4/1955 | Barchoff | |
| 2,883,858 A * | 4/1959 | Bishman | 73/45.6 |
| 3,154,206 A | 10/1964 | Gillett, Jr. et al. | |
| 3,321,169 A | 5/1967 | Fowler | |
| 3,491,427 A | 1/1970 | Zimmerman et al. | |
| 3,517,959 A | 6/1970 | Ferguson | |
| 3,582,125 A | 6/1971 | Collins | |
| 3,830,388 A * | 8/1974 | Mott | 414/429 |
| 4,221,528 A | 9/1980 | Gordos | |
| 4,465,422 A * | 8/1984 | Blust et al. | 414/433 |
| 4,546,681 A * | 10/1985 | Owsen | 82/162 |
| 4,571,142 A | 2/1986 | Niewald et al. | |
| 4,600,354 A | 7/1986 | Niewald et al. | |
| 4,648,778 A * | 3/1987 | Schultz | 414/626 |
| 5,064,334 A | 11/1991 | Cooley | |
| 5,176,487 A * | 1/1993 | Flitton | 414/428 |
| 5,813,659 A | 9/1998 | Heidle | |
| 6,331,025 B1 * | 12/2001 | Douglas | 294/110.1 |
| 7,278,671 B1 | 10/2007 | Herford | |
| 2006/0182587 A1* | 8/2006 | Hrkal | 414/626 |

* cited by examiner

*Primary Examiner* — Glenn Myers
(74) *Attorney, Agent, or Firm* — Mallory M. Henninger; Advent, LLP

(57) ABSTRACT

A wheel lifting device comprising a first portion and a second portion is disclosed. Each of the first portion and the second portion comprise a vertical member, a horizontal member, and a plurality of rotatatable devices coupled to and spaced apart laterally on the horizontal member. The horizontal member of the first portion is generally parallel to the horizontal member of the second portion and both horizontal members are generally perpendicular to a plane defined by the two vertical members.

7 Claims, 3 Drawing Sheets

WHEEL LIFTING DEVICE

CROSS REFERENCE TO RELATED APPLICATION

This application is a non-provisional of U.S. Application Ser. No. 61/045,514 filed on Apr. 16, 2008, which is incorporated by reference herein in its entirety.

BACKGROUND OF THE INVENTION

This application relates to devices for lifting wheels. In particular, the application relates to devices for lifting large wheels such as dual tractor wheels.

Dual tractor wheels can be extremely heavy and cumbersome. Removing and replacing the outside wheels on a tractor can take a significant amount of time that adversely affects productivity. Such wheels are often too heavy to be moved by a single person, and the size of such wheels can make them too cumbersome to be easily positioned. One solution to these problems is to lift the wheel with a hoist, so that a user can position the wheel for installation on a vehicle. Such hoists, however, have not provided adequate stability when lifting wheels. For example, the Wheel Clamp disclosed in U.S. Pat. No. 5,064,334, provides contacts for only two points on an inside surfaces of the wheel rim. This may allow the tire to rotate about a vertical axis in relation to the wheel clamp. Also, the use of only two contact points places all of the load from the wheel's weight at those points. This loading can restrict the rotation of the bearings used for rotating the wheel when larger wheels are lifted.

Accordingly, there is a need for a device that is capable of easily lifting large wheels. There is a further need for a device that can be used with large wheels while allowing for rotation of the wheel in the device while distributing the load of the wheel's weight.

BRIEF SUMMARY OF THE INVENTION

A wheel lifting device comprising a first portion and a second portion is disclosed. Each of the first portion and the second portion comprise a vertical member, a horizontal member, and a plurality of rotatatable devices coupled to and spaced apart laterally on the horizontal member. The horizontal member of the first portion is generally parallel to the horizontal member of the second portion and both horizontal members are generally perpendicular to a plane defined by the two vertical members.

DETAILED DESCRIPTION OF THE INVENTION

Figure 1:
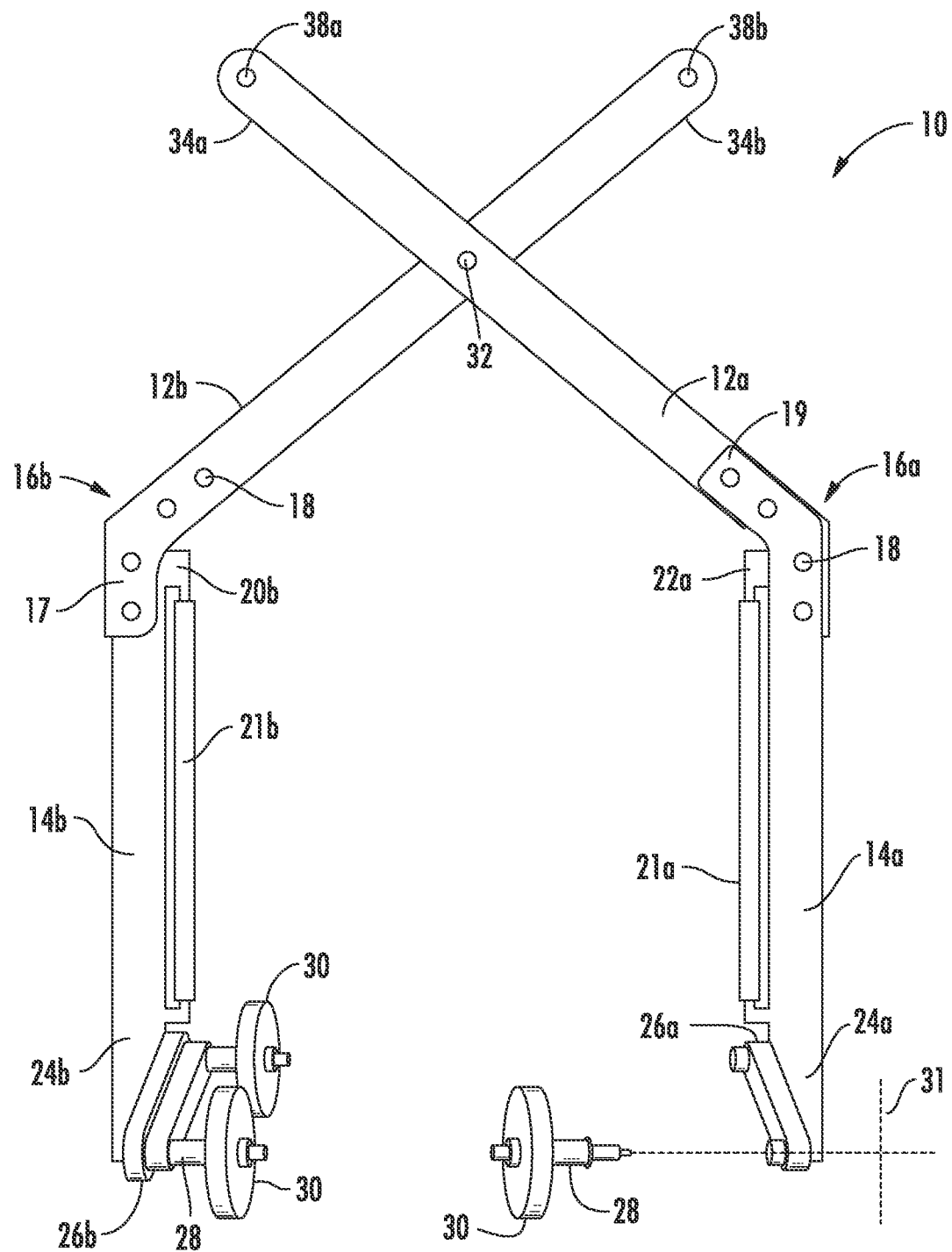
FIG. 1 is a perspective view of a wheel lifting device.
Figure 2:
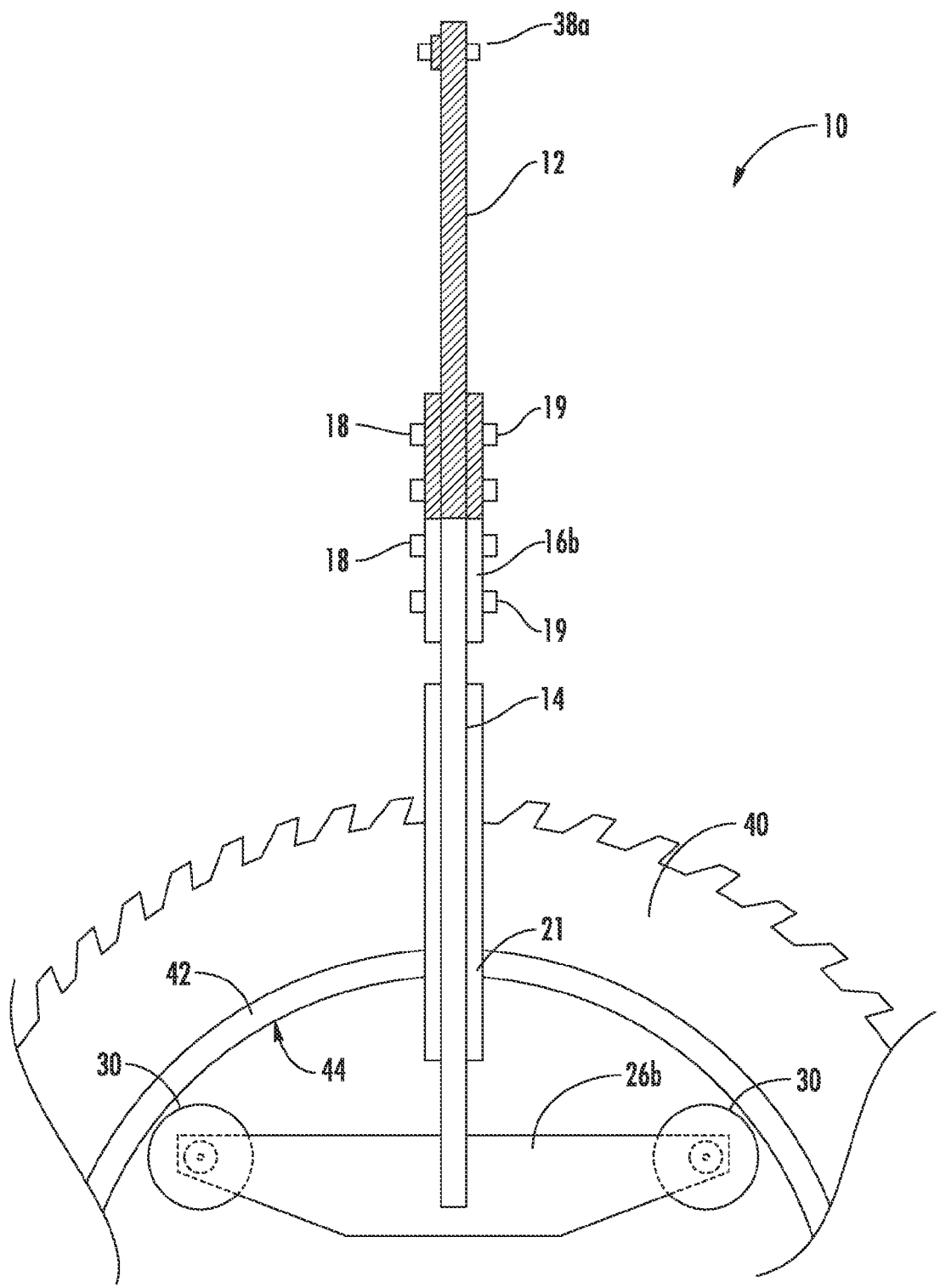
FIG. 2 is an elevation view of half of the wheel lifting device of FIG. 1.
Figure 3:
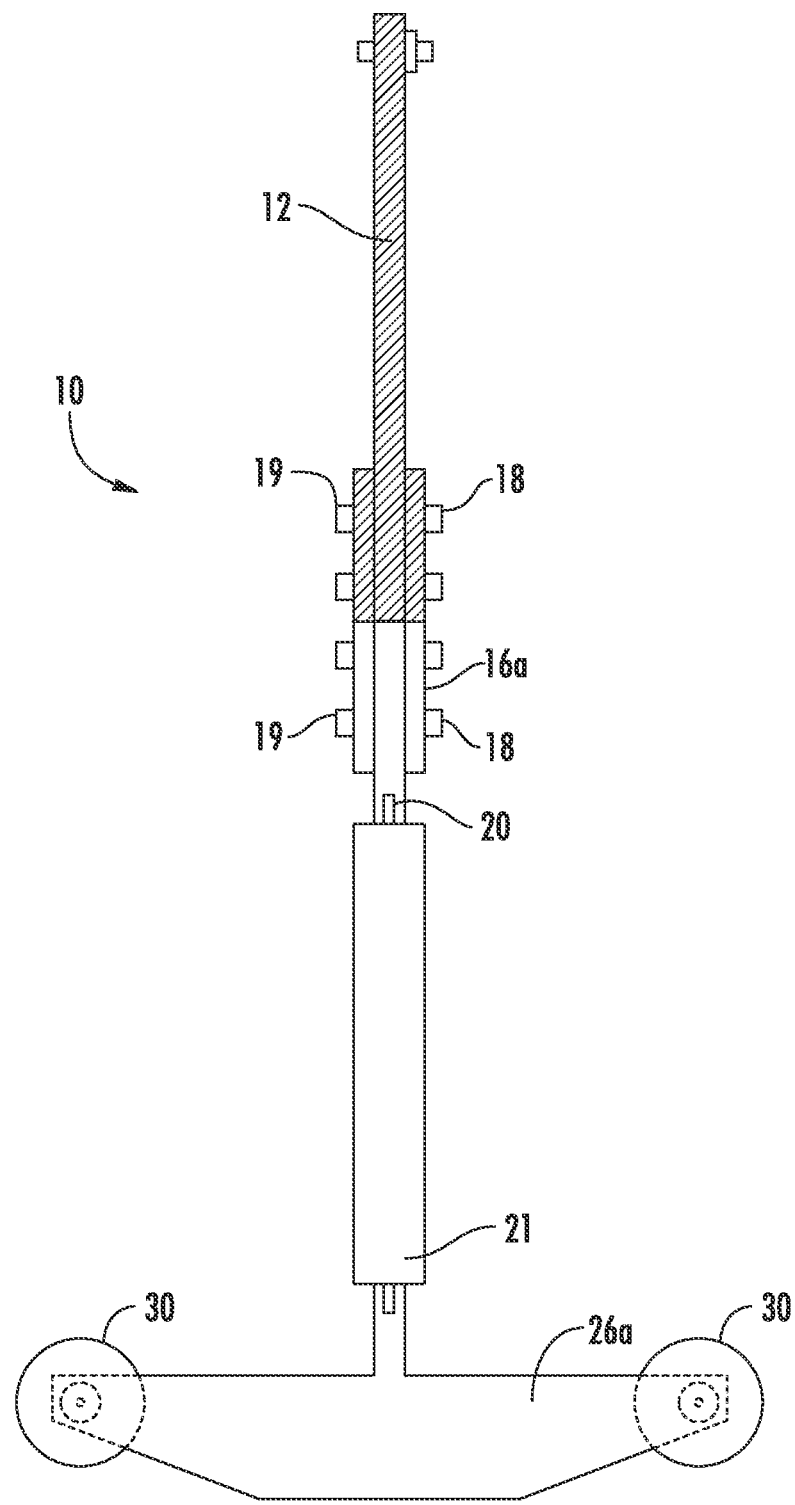
FIG. 3 is an elevation view of half of the wheel lifting device of FIG. 1.

Referring to FIGS. 1, 2, and 3, a device 10 includes upper members 12a and 12b, which cross each other. The device generally comprises two halves, that are designated with like reference numbers with components of one half being designated with 'a' and components of the other half designated with 'b'. Coupled to each of upper members 12a and 12b are lower members 14a and 14b. Each of the lower members 14a and 14b are coupled to upper members 12a and 12b by couplings 16a and 16b respectively. Each of couplings 16a and 16b are coupled to upper members 12a and 12b and lower members 14a and 14b by fasteners 18 to form two rigid structures each comprising an upper member, a lower member and a coupling. Couplings 16a and 16b may be formed by overlapping portions of upper members 12 (portion 17) and lower members 14 (portion 19). Fasteners 18 may be bolts with nuts, screws, rivets or any other suitable fastener. Alternatively, an upper member may be welded to a lower member with or without a coupling. In yet other embodiments, the upper member and lower member may be formed as a single unitary body.

Vertical members 20a and 20b may be coupled to lower members 14a and 14b at a plurality of points 22a, 22b, 24a, and 24b. In particular, the vertical members may be welded to the lower members at these points. In some embodiments, vertical members 20a and 20b are rods welded to lower members 14a and 14b at weld points corresponding to 22 and 24. A pipe, 21a may be positioned around vertical member 20a between points 22a and 24a. The pipe may freely rotate around vertical member 20a such that a tire may be rotated when the device is in use. Horizontal members 26a and 26b are shown coupled to vertical members 20a and 20b. Alternatively, horizontal members 26a and 26b may be coupled to lower members 24a and 24b. Horizontal members 26a and 26b extent generally parallel to one another and perpendicular to a plane containing upper members 12a and 12b and vertical members 14a and 14b. Each of horizontal members 26a and 26b has two extensions 28 mounted thereto. Extensions 28 are separated laterally and a wheel 30 is mounted to each extension 28. In other embodiments, bearings or other suitable rotatable devices may be used in place of the wheel. Extensions 28 extend inwardly form each half ('a' or 'b') towards the other. In some embodiments, extensions 28 may be removably coupled to horizontal members 26a and 26b, such as by use of pin 31 or other suitable coupling means. In these embodiments, the extensions and corresponding wheels may be removed to make positioning the device around a mounted wheel easier.

When the two halves are assembled, the upper members 12a and 12b may be coupled at a pivot point 32 such that portions 34a and 34b of upper members 12a and 12b extend above pivot point 32. A chain or other device may be coupled to portions 34a and 34b by fasteners 38a and 38b. Device 10 may be lifted by the chain 36.

The device 10 may be used to more easily lift a large wheel, such as a tractor dual tire and rim and position the wheel for placement on an axel. Wheel 40 includes a rim 42 having an inner surface 44. Wheels 30 of device 10 contact surface 44 when device 10 is used to lift wheel 40. When wheel 40 is lifted, for example by chain hoist, wheels 30 bear on surface 44 of rim 42. Wheel 40 may be rotated around its axis to align lug holes with lugs for attaching wheel 40 to a vehicle. When wheel 40 is lifted, tension in the chain biases to two halves of device 10 inwardly against wheel 40. When wheel 40 is lowered, the tension releases and device 10 may be removed. While chain hoist is shown mounted on a rail on a rafter, the device may be lifted with a wheel by a front end loader or other machine capable of positioning the device and wheel for installation or removal on a vehicle.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

What is claimed is:

1. A wheel lifting device comprising:
   a first arm comprising a first upper member and a first lower member, the first lower member extending downward from the first upper member;
   a second arm comprising a second upper member and a second lower member, the second lower member extending downward from the second upper member, the second upper member pivotally connected to the first upper member in a scissors arrangement so that the first lower member and the second lower member are spaced apart to receive at least a portion of a wheel assembly there between;
   a first wheel support assembly coupled to the first lower member, the first wheel support assembly comprising a first cross member extending from the first lower member, a first roller assembly coupled to the first cross member, and a second roller assembly coupled to the first cross member, the first and second roller assemblies spaced apart along the first cross member and configured to bear on a cylindrical inner surface of a rim of the wheel assembly at corresponding spaced apart points along a first side of the wheel assembly when the wheel assembly is lifted; and
   a second wheel support assembly coupled to the second lower member, the second wheel support assembly comprising a second cross member extending from the second lower member, a third roller assembly coupled to the second cross member, and a fourth roller assembly coupled to the second cross member, the third and fourth roller assemblies spaced apart along the second cross member to bear on the cylindrical inner surface of the rim at two corresponding spaced apart points along a second side of the wheel assembly when the wheel assembly is lifted;
   wherein the first, second, third, and fourth roller assemblies are configured to rotate to facilitate rotation of the wheel assembly.

2. The wheel lifting device as recited in claim 1, wherein the first upper member includes an upper end having a first hoist point and the second upper member includes an upper end having a second hoist point, and wherein the first hoist point and the second hoist point are configured to receive the application of upward forces to lift the wheel assembly.

3. The wheel lifting device as recited in claim 2, wherein the upward forces comprise tension in a chain coupled to the first hoist point and the second hoist point.

4. The wheel lifting device as recited in claim 2, wherein the first upper member and the second upper member are pivotally connected at a pivot point.

5. The wheel lifting device as recited in claim 4, wherein the application of upward forces to the first hoist point and the second hoist point causes the first arm and the second arm to pivot about the pivot point to bias the first lower member and the second lower member inward against the wheel assembly.

6. The wheel lifting assembly as recited in claim 5, further comprising a first roller guide assembly coupled to the first lower member and a second roller guide assembly coupled to the second lower member, the first roller guide assembly including a first roller configured to rotationally engage the first side of the wheel assembly and the second roller guide assembly including a second roller configured to engage the second side of the wheel assembly as the wheel assembly is rotated.

7. The wheel lifting assembly as recited in claim 6, wherein the first roller guide assembly extends along a side of the first member and the second roller guide assembly extends along a side of the second member.

\* \* \* \* \*